United States Patent [19]
Jung

[11] Patent Number: 6,097,732
[45] Date of Patent: *Aug. 1, 2000

[54] APPARATUS AND METHOD FOR CONTROLLING TRANSMISSION PARAMETERS OF SELECTED HOME NETWORK STATIONS TRANSMITTING ON A TELEPHONE MEDIUM

[75] Inventor: Kyongsoo Michael Jung, Fremont, Calif.

[73] Assignee: Advanced Micro Devices, Inc., Sunnyvale, Calif.

[ * ] Notice: This patent is subject to a terminal disclaimer.

[21] Appl. No.: 09/182,987

[22] Filed: Oct. 30, 1998

[51] Int. Cl.[7] .......................................... H04J 3/16

[52] U.S. Cl. ............................ 370/466; 370/470

[58] Field of Search ..................... 370/419, 420, 370/342, 252, 465, 522, 468, 463, 445, 446, 466, 470; 375/222; 714/748, 758, 717

[56] References Cited

U.S. PATENT DOCUMENTS

| | | | |
|---|---|---|---|
| 5,023,872 | 6/1991 | Annamalui .............................. | 714/717 |
| 5,062,104 | 10/1991 | Lubarsky et al. ...................... | 370/466 |
| 5,808,767 | 9/1998 | Williams et al. ....................... | 359/152 |
| 5,889,841 | 3/1999 | Shin ......................................... | 379/73 |

*Primary Examiner*—Salvatore Cangialosi

[57] ABSTRACT

A physical layer transceiver of a home network station connected to a telephone medium has an architecture enabling adaptation of detection circuitry based on received network signals to enable reliable recovery of data signals. The physical layer transceiver includes an input amplifier that amplifies network signals according to one of 128 gain settings set by a receiver gain control signal. A signal conditioning circuit includes an envelope detector configured for outputting an envelope of the amplified received signal, and an energy detector configured for outputting an energy signal of the amplified received signals. The envelope signal and the energy signal are supplied to slicer threshold circuits, configured for outputting noise, peak, data event and energy event signals based on noise threshold, peak threshold, data transition threshold, and energy threshold signals, respectively. A digital controller controls the input amplifier gain and the threshold values, and adjusts the gain and threshold values based on the noise event signal and the peak event signal within an access ID (AID) interval. A link controller monitors the number of CRC errors in the received data packets on a per-node basis. If one transmitting station is detected as having a number of errors exceeding a first threshold, the link controller causes a reconfigure command to be output to the identified transmitting station, causing the identified transmitting station to adjust transmission parameters for improved reception reliability. The use of the reconfigure command by a receiving network node enables transmission parameters to be adjusted in selected network stations encountering severe distortion due to the topology of the home network. Alternately, the receiving network node may output an AID command packet with new power and speed settings to all transmitting network stations on the network.

6 Claims, 6 Drawing Sheets

APPARATUS AND METHOD FOR CONTROLLING TRANSMISSION PARAMETERS OF SELECTED HOME NETWORK STATIONS TRANSMITTING ON A TELEPHONE MEDIUM

FIELD OF THE INVENTION

The present invention relates to network interfacing, and more particularly, to methods and systems for controlling transmission of data between network stations connected to a telephone line.

DESCRIPTION OF THE RELATED ART

Local area networks use a network cable or other media to link stations on the network. Each local area network architecture uses a media access control (MAC) enabling network interface cards at each station to share access to the media.

Conventional local area network architectures use media access controllers operating according to half-duplex or full duplex Ethernet (ANSI/IEEE standard 802.3) protocol using a prescribed network medium, such as 10 BASE-T. Newer operating systems require that a network station to be able to detect the presence of the network. In an Ethernet 10 BASE-T environment, the network is detected by the transmission of a link pulse by the physical layer (PHY) transceiver. The periodic link pulse on the 10 BASE-T media is detected by a PHY receiver, which determines the presence of another network station transmitting on the network medium based on detection of the periodic link pulses. Hence, a PHY transceiver at Station A is able to detect the presence of Station B, without the transmission or reception of data packets, by the reception of link pulses on the 10 BASE-T medium from the PHY transmitter at Station B.

Efforts are underway to develop an architecture that enables computers to be linked together using conventional twisted pair telephone lines instead of established local area network media such as 10 BASE-T. Such an arrangement, referred to herein as a home network environment, provides the advantage that existing telephone wiring in a home may be used to implement a home network environment. However, telephone lines are inherently noisy due to spurious noise caused by electrical devices in the home, for example dimmer switches, transformers of home appliances, etc. In addition, the twisted pair telephone lines suffer from turn-on transients due to on-hook and off-hook and noise pulses from the standard POTS telephones, and electrical systems such as heating and air conditioning systems, etc.

An additional problem in telephone wiring networks is that the signal condition (i.e., shape) of a transmitted waveform depends largely on the wiring topology. Numerous branch connections in the twisted pair telephone line medium, as well as the different associated lengths of the branch connections, may cause multiple signal reflections on a transmitted network signal. Telephone wiring topology may cause the network signal from one network station to have a peak-to-peak voltage on the order of 10 to 20 millivolts, whereas network signals from another network station may have a value on the order of one to two volts. Hence, the amplitude and shape of a received pulse may be so distorted that recovery of a transmit clock or transmit data from the received pulse becomes substantially difficult.

SUMMARY OF THE INVENTION

There is a need for a network station having a physical layer transceiver capable of reliably recovering data from a received network signal on a telephone line medium.

There is also a need for a network station, receiving network signals from different network nodes on a telephone line medium, to minimize loss of data due to distortion caused by telephone wiring topology on a per-node basis.

There is also need for an arrangement for a network station receiving network signals from network nodes on a telephone line medium to overcome distortion effects caused by the telephone line medium by selectively adjusting transmitter performance on a node-specific basis.

These and other needs are attained by the present invention, where a network station receiving data packets from different network stations on a telephone line medium selectively outputs a configuration packet having a prescribed destination address, based on detected errors in the received data packets, that causes a selected network stations corresponding to the destination address to adjust transmission parameters for improved reception reliability.

According to one aspect of the present invention, a network station configured for sending and receiving network signals between other network stations on a telephone line medium includes a media access transceiver configured for receiving first data packets from the telephone line medium and transmitting second data packets onto the telephone line medium at a selected output gain and transmission speed, and is also configured for detecting a presence of an error in the first data packets. The network station also includes a link controller configured for causing the media access transceiver to output onto the telephone line medium a configuration data packet, having a selected destination address corresponding to a selected one of the other network stations, based on the detected errors in the first data packets from the selected one network station reaching a first prescribed threshold. The configuration data packet causes the selected one network station to adjust at least one transmission parameter for reduction of the errors in received data packets. The detection of errors in data packets from the selected one network station enables the link controller to monitor the relative performance of different transmitting network stations to determine which network station have a relatively high error rate due to distortion effects caused by the telephone line medium. Hence, the link controller can output a configuration data packet to a selected network station, enabling the selected network station to individually reconfigure its corresponding transmission parameters to overcome distortion effects caused by telephone wiring topology. Hence, a receiving network station can control transmission parameters of selected stations encountering severe distortion relative to other network nodes on the telephone line medium.

Another aspect of the present invention provides a method in a network station of controlling transmission of data packets by other network stations via telephone line medium. The method includes receiving the data packets from the other network stations via the telephone line medium, determining a number of errors in data packets from one of the other network stations exceeding a first prescribed threshold, and outputting onto the telephone line medium a configuration packet to the one network station based on the corresponding number of errors exceeding the first prescribed threshold.

Still another aspect of the present invention provides a method of transmitting data between a plurality of network stations connected to a telephone line medium. The method includes transmitting data packets from transmitting network stations onto the telephone line medium in accordance with respective transmission parameters. The transmitted data packets are received in the second network station from the telephone line medium and a number of errors are identified in the transmitted data packets from at least one of the transmitting network stations. The method also includes transmitting a configuration data packet from the second network station to the one transmitting network station via the telephone line medium in response to the number of errors corresponding to the one transmitting network station exceeding a first prescribed threshold, and changing at least one of the corresponding transmission parameters by the one transmitting network station in response to reception of the configuration data packet.

Additional advantages and novel features of the invention will be set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
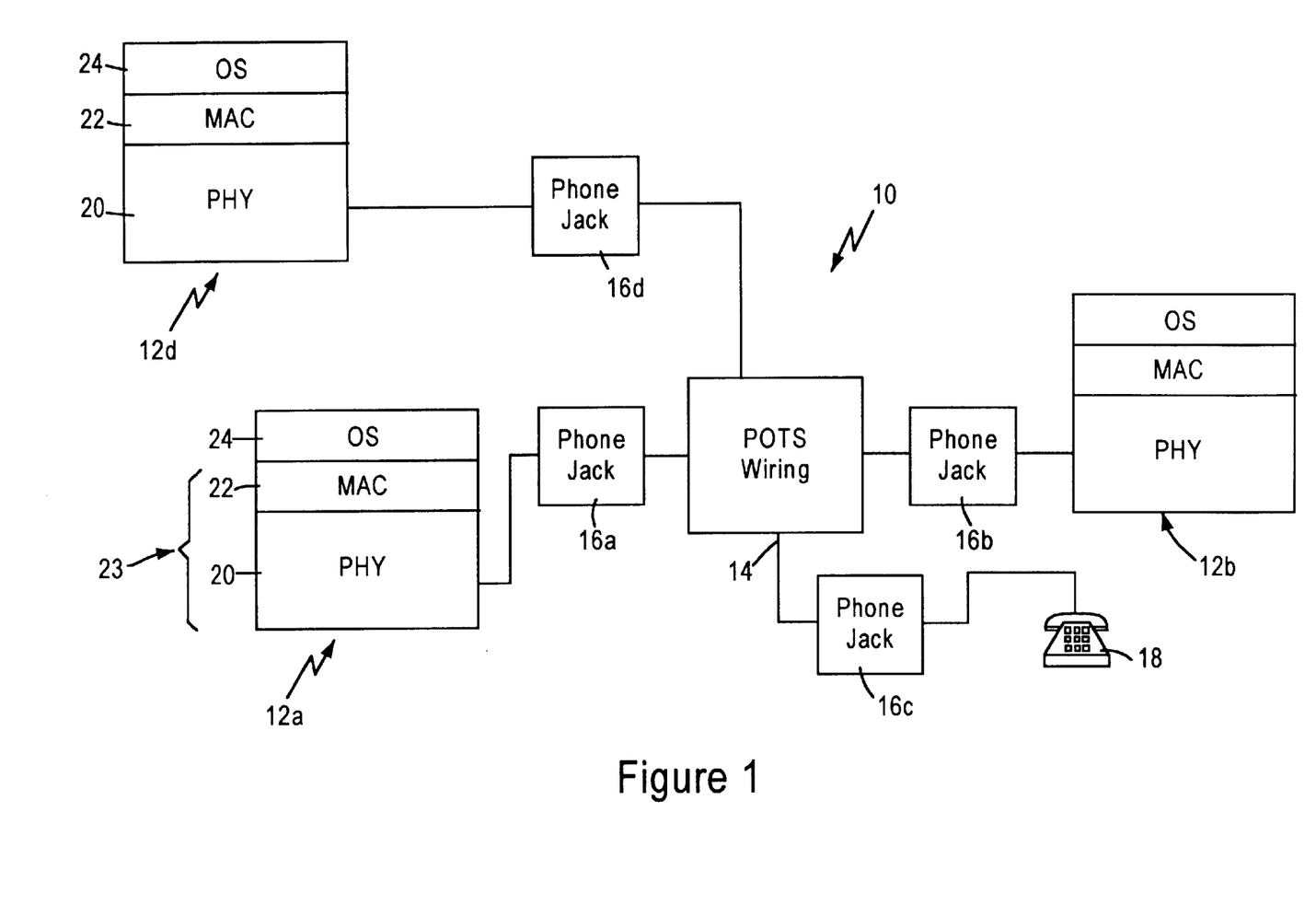
FIG. 1 is a block diagram illustrating a local area network deployed over residential twisted pair wiring.

FIG. 1 is a diagram of an Ethernet (IEEE 802.3) local area network 10 implemented in a home environment using twisted pair network media according to an embodiment of the invention. As shown in FIG. 1, the network 10 includes network stations 12a and 12b that are connected to a telephone line (twisted pair) wiring 14, via RJ-11 phone jacks 16a and 16b respectively. A telephone 18 connected to the RJ-11 phone jack 16c may continue to make phone calls while stations 12a and 12b are communicating.

As shown in FIG. 1, each network station 12, for example a personal computer, printer, or intelligent consumer electronics device, includes a physical layer (PHY) transceiver 20, a media access (MAC) layer 22, and an operating system (OS) layer that performs higher layer function according to the OSI reference model.

Figure 2A:
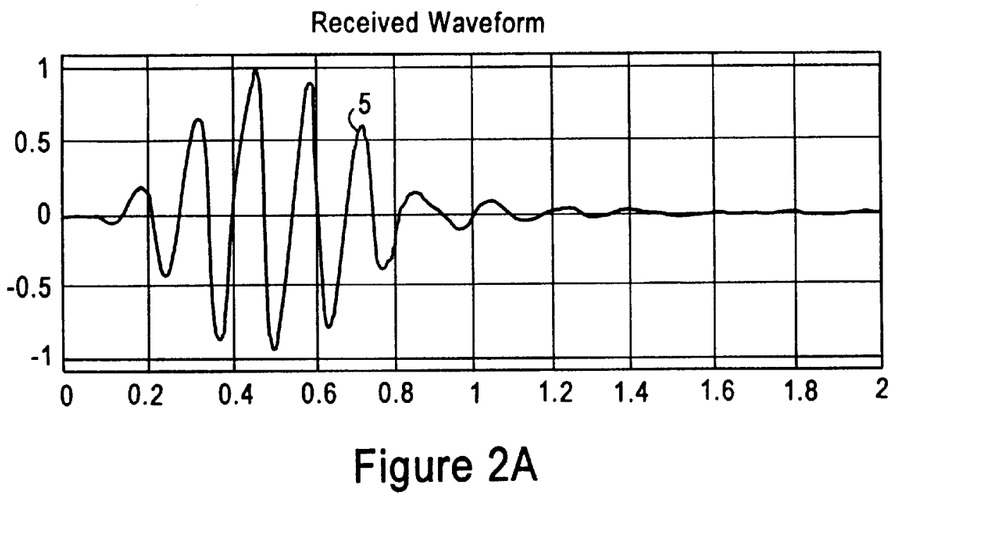
FIGS. 2A, 2B, 2C and 2D are diagrams illustrating processing of received waveforms by the physical layer transceiver of FIG. 1 according to an embodiment of the present invention.
Figure 2B:
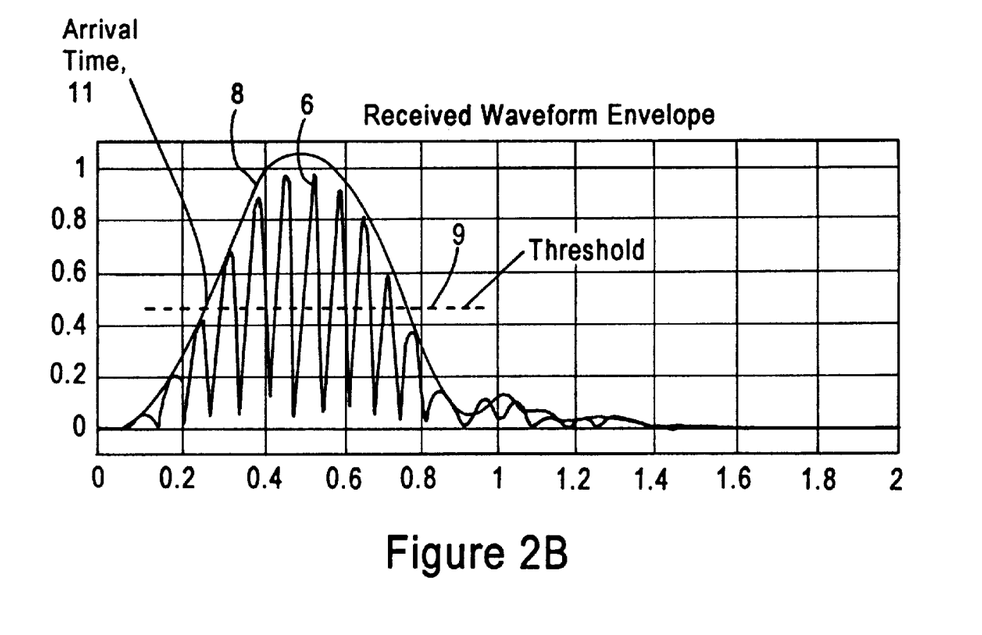

The stations 12a and 12b communicate by transmitting band limited pulses that carry network data modulated in the analog network signals. In particular, the physical layer transmitter transmits a band limited pulse 5, illustrated in FIG. 2A. The arrival position of a received pulse is detected using a waveform envelope 8 representing the absolute value 6 of the received signal, shown in FIG. 2B. The envelope 8 is supplied to a slicing circuit described below, having a threshold level 9 selected to identify the arrival position 11 of the received pulse. When the envelope 8 crosses the threshold level 9, the slicing circuit detects the arrival position 11 of the pulse as an event representing a data pattern. This event can be used to recover a transmit clock and transmit data from the received signal.

Figure 2C:
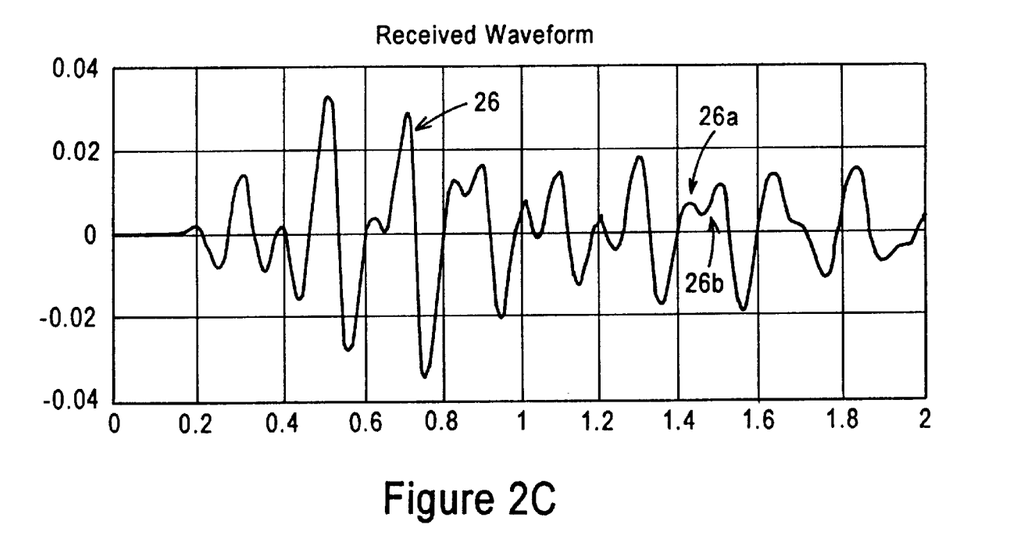
Figure 2D:
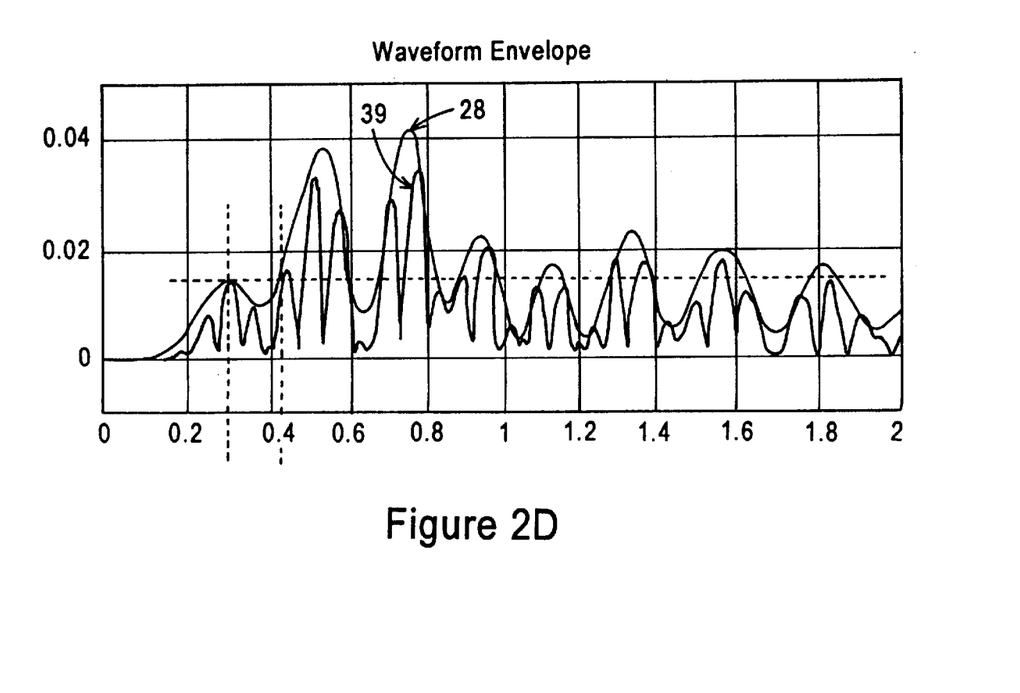

However, in telephone wire networks, the received envelope waveform depends largely on the wiring topology. As the wiring topology may cause multiple signal reflections, the shape of a received pulse may be so distorted that the envelope may have multiple localized maximum points. In addition, the wiring topology in the home network is variable. Hence the distortion of the received pulse is unpredictable, resulting in a waveform 26 as shown in FIG. 2C. As shown in FIG. 2C, the distorted waveform 26 of a received pulse signal has multiple localized maximum and minimum points 26a and 26b due to wiring topology. FIG. 2D illustrates the envelope waveform 28 of the distorted waveform 26. Hence, if a threshold value is not properly set for detection of a data pulse, a slicing circuit may identify multiple pulse positions at which crosses a threshold level. As a result, a unique time value for the position of a received pulse may not be detected resulting in data recover errors.

According to the disclosed embodiment, an adaptive physical layer transceiver architecture adaptively adjusts the signal processing circuitry on both the receive side and transmit side to optimize accurate recovery data from the transmitted network signals, and optimize transmitter performance to overcome adverse conditions due to home telephone wiring topology. In particular, the disclosed embodiment includes a link controller within the network station 12, for example control routines within the OS layer 24 executable by the host microprocessor or logic circuitry implemented in the OS layer 24 or the MAC 22. The link controller monitors the number of errors in received data packets and selectively controls the output of command packets onto the network 10, causing other network stations receiving the command packets to improve their respective transmission characteristics. The improvement of transmission characteristics, for example increasing an output amplifier gain or reducing a data transmission rate, enables the transmitted data packet to be more reliably received by a receiving network station, reducing the bit error rate of received data packets. An overview of the physical layer transceiver architecture will first be provided, followed by a description of the arrangement for controlling transmission levels in transmitting network stations.

Physical Layer Architecture

Figure 3:
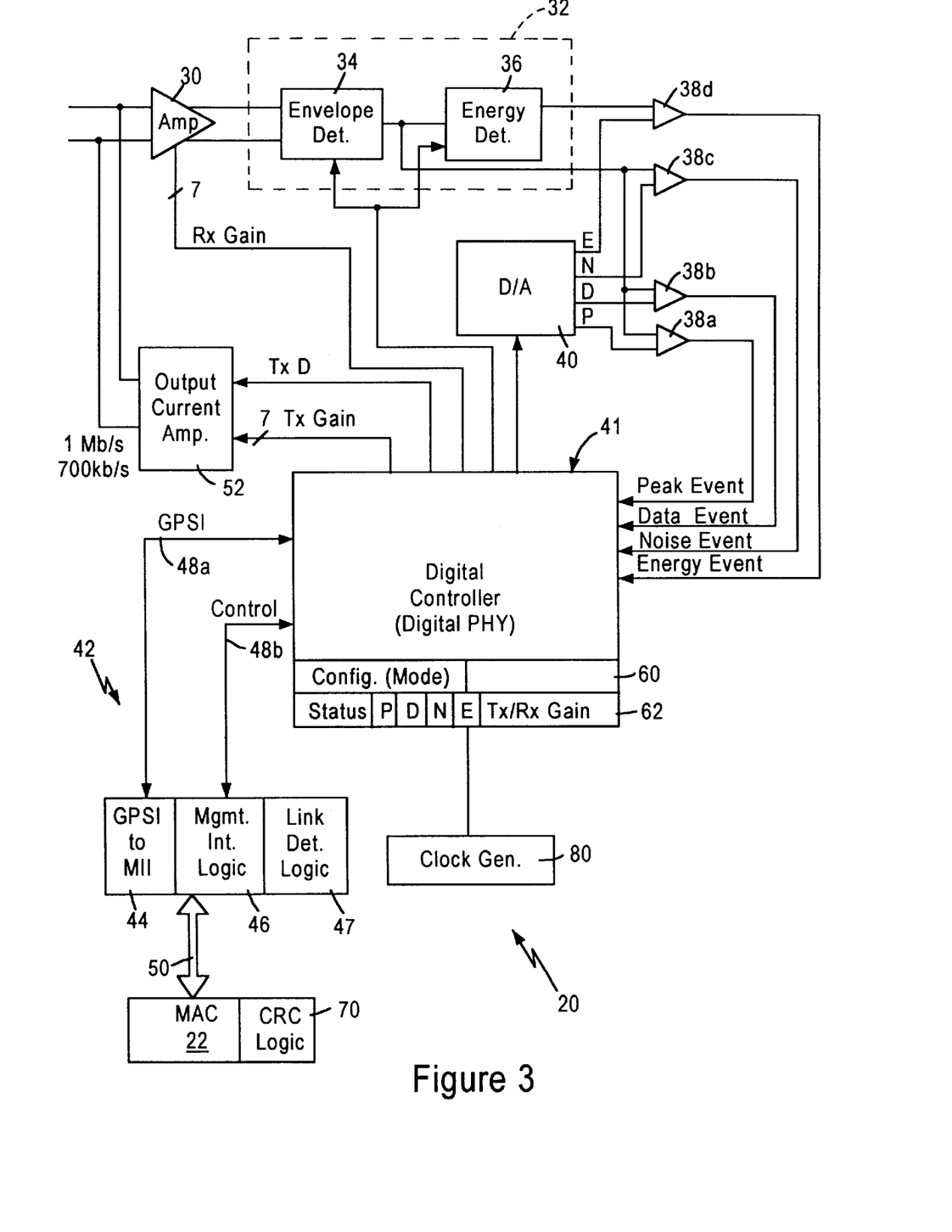
FIG. 3 is a block diagram illustrating the architecture of the physical layer transceiver of FIG. 1 according to an embodiment of the present invention.

FIG. 3 is a block diagram of the physical layer transceiver 20 according to an embodiment of the present invention. As shown in FIG. 3, the physical layer transceiver 20 includes an input amplifier 30 for amplifying analog network received from the telephone medium, such as the network signals shown in FIG. 2C. As described below, the input amplifier 30 has a variable gain controlled by a 7-bit gain signal (RxGain) for amplifying received network signals. The physical layer transceiver 20 also includes a signal conditioning circuit 32 that includes an envelope detection circuit 34 and an energy detection circuit 36. The envelope detection circuit 34 generates the envelope signal 28 in response to the amplified received signal 26. For example, the envelope detector 34 includes an absolute value circuit (e.g., a rectifier circuit) that generates an absolute value signal 39 of the amplified received signal 26, and a low pass filter coupled to the rectifier circuit for filtering out highfrequency components the rectified signal, resulting in the envelope signal 28. The envelope signal 28 is output from the envelope detector 34 and supplied to the energy detector 36. The energy detector 36 includes an integrator which performs the mathematical process of integration over time to produce a signal proportional to energy of the received pulse signal.

As shown in FIG. 3, physical layer transceiver 20 also includes a plurality of slicer circuits 38, and a digital to analog converter 40 for supplying analog threshold signals to the slicer circuits 38. The physical layer transceiver also includes a digital controller 41 configured for controlling the digital analog converter 40 for outputting the threshold signal E, N, D, P, described below.

In particular, the digital controller 41 is configured for controlling the threshold values applied to the slicers 38a, 38b, and 38d based on the signals supplied by the slicers 38 to the digital controller 41. In particular, slicer circuit 38a outputs a peak event signal indicating with respect to time whether the envelope signal 28 exceeds a peak threshold (P) supplied by the digital to analog converter 40 under the control of the digital controller 41. Slicer circuits 38b and 38c output data event signals and noise event signals indicating with respect to time whether the envelope signal 28 exceeds a data transition threshold (D) and a noise threshold (N) respectively. The slicer circuit 38d outputs an energy event signal indicating with respect to time whether the energy signal output by energy detector 36 exceeds an energy threshold (E) supplied by the D/A converter 40.

Hence, the slicer circuits 38a, 38b, and 38c output peak, data transition, and noise event signals indicating with respect to time whether the envelope signal 28 exceeds a peak threshold (P), a data transition threshold (D), and a noise threshold (N), respectively. Slicer 38d, however, outputs an energy event signal indicating with respect to time whether the energy signal from the energy detector 36 exceeds an energy threshold (E).

The digital controller 41 controls the noise, peak and data transition thresholds based on the noise event signals and the peak signals output by the slicers 38c and 38a, respectively, and outputs digital data signals to the media access controller 22 via a media independent interface (MII) 50 based on either the energy event signals or the data event signals.

In particular, the digital controller 41 adjusts the gain of the amplifier 30, and the threshold values P, D, N, and E generated by the D to A converter 40 during an access ID (AID) interval. AID is a specific identifier which is unique for each network station 12. AID is a series of 8 pulses output from the PHY transceiver 20 of the transmitting station onto the telephone medium 14, where the time intervals between the first pulse and the successive 7 pulses define respective values. For example, assume a second pulse is output by the PHY transceiver 20 following a first pulse at time T1. If T1 equals 66 clock cycles (assuming a 116 nanosecond clock), the corresponding value is 00; if T1 equals 86, 106, or 126 clock cycles, the values are 01, 10, or 11, respectively, where the maximum interval between pulses is 128 clock cycles. The same arrangement is used to detect the values used in time intervals T2, T3, T4, T5, and T7. Hence, the presence of the valid AID can be determined by detecting a first pulse, and detecting a presence of 7 successive pulses using detection windows each having a duration of 128 clock cycles.

According to the disclosed embodiment, AID replaces the preamble conventionally used in 10 Base-T Ethernet (IEEE 802.3) systems. Hence, the digital controller 41 of the present invention uses the AID interval to selectively tune the input amplifier 30 to one of 128 different gain settings selected by the RxGain signal, and set the threshold values used by the slicer circuits 38 by supplying digital threshold values to the D/A converter 40. Once the digital controller 41 has tuned the input amplifier 30 and the threshold values of the slicer circuits 38, the digital controller 41 uses either the data transition event signals from the slicer circuit 38b or the energy event signal from the slicer circuit 38d for recovering the data signals, described below.

The physical layer transceiver also includes a transmitter portion 52 (e.g., an output current amplifier), that converts transmit data (TxD) to an analog network signal. The analog network signal is output at a selected one of 128 output gain values based on the 7-bit transmit gain (TxGain) signal output by the digital controller 41.

As shown in FIG. 3, the physical layer transceiver 20 also includes an output interface 42 including an MII to general purpose serial interface (GPSI) converter 44, management interface logic 46, and buses 48a and 48b. The bus 48a transfers transmit and receive data between the MAC 22 and the digital controller 41 in GPSI format. The converter 44 converts the GPSI format data to nibble-wide data for transfer to the MAC 22 via the MII 50. Similarly, transmit data from the MAC 22 supplied via the MII 50 is converted from nibble-wide data to GPSI format, and supplied to the digital controller 41 via the GPSI data bus 48a.

The output interface 42 also includes a control data bus 48b for transferring configuration data and status information between the digital converter 41 and the management interface logic 46. In particular, the management interface logic 46 is configured for storing configuration data, received from the MAC 22 via the MII 50, into the digital controller 41 at selected control registers 60. Note that the threshold value E for the energy detector slicer circuit 38d may be supplied by the management agent via the MII 50 and set in the configuration registers 60. The digital controller 41 also includes status registers 62 that include, for example, the threshold values for the threshold signals P, D, and E, and the 7-bit input and output amplifier gain control signals (RxGain, TxGain). Hence, a management agent (e.g., a link controller, described below) can access registers 60 and 62 for reading and writing of control information, and reading status information from the status registers 62. The interface 42 also includes link detection logic 47 for determining whether a valid link is detected on the network medium 14. If no valid AID is detected within three successive detection intervals, each having a preferred duration of about 800 milliseconds, the link status is sent to an invalid state. A valid AID may be either a link packet or a preamble for a data packet.

Controlling Transmission Parameters of Selected Stations

Figure 5:
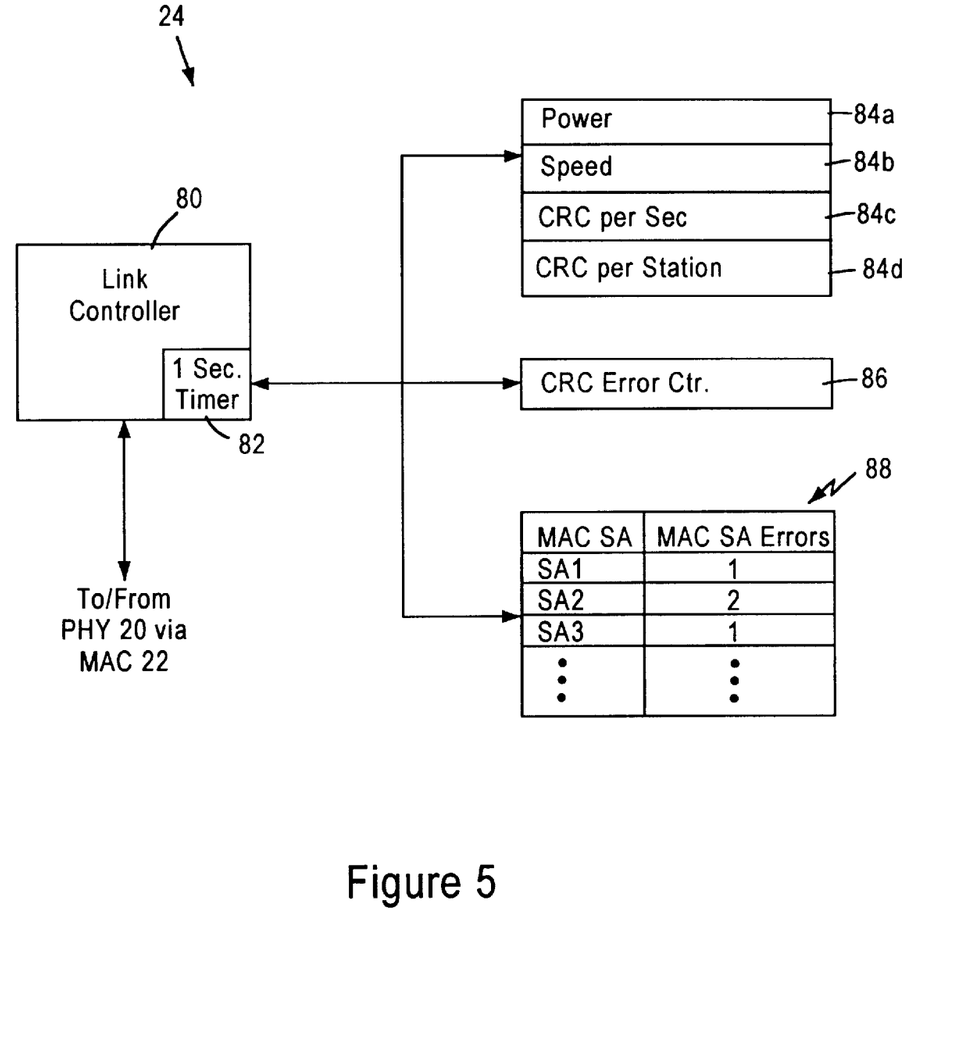
FIG. 5 is a diagram of a link controller within the network station for controlling transmission parameters according to an embodiment of the present invention.

FIG. 5 is a diagram of a link controller within the network station for controlling transmission parameters according to an embodiment of the present invention. As shown in FIG. 5, the link controller 80 is part of the operating system 24, which may be implemented as a driver software executable by a host microprocessor, or as a state machine implemented in silicon. The link controller system includes the link controller 80 having an internal timer 82. The system also includes a plurality of memories 84, an error counter 86, and a table 88 configured for storing media access control source addresses (MAC SA) for different network station 12 having transmitted data packet to the receiving network station within a prescribed detection interval counted by the timer 82 (e.g., 1 second). In particular, the table 88 stores the source address of each received data packet having a detected CRC error. For example, the link controller 80 stores in table 88 a source address of a first network station (SA 1) having transmitted a data packet that had a detected CRC error. Similarly, the entries SA 2 and SA 3 represent MAC addresses of other network stations having transmitted data packets with detected CRC errors. As shown in FIG. 5, the table 88 tracks the MAC addresses for each of the network stations having transmitted data packets with errors, plus the number of CRC errors detected from the corresponding transmitting stations in the column entitled "MAC SA Errors". Hence, the sum of the errors in the table 88 equal the error count in the CRC error counter 86 during the detection interval counted by the timer 82. As described below, the error count in the counter 86 and the table 88 are cleared at the end of each 1 second detection interval.

Figure 4:
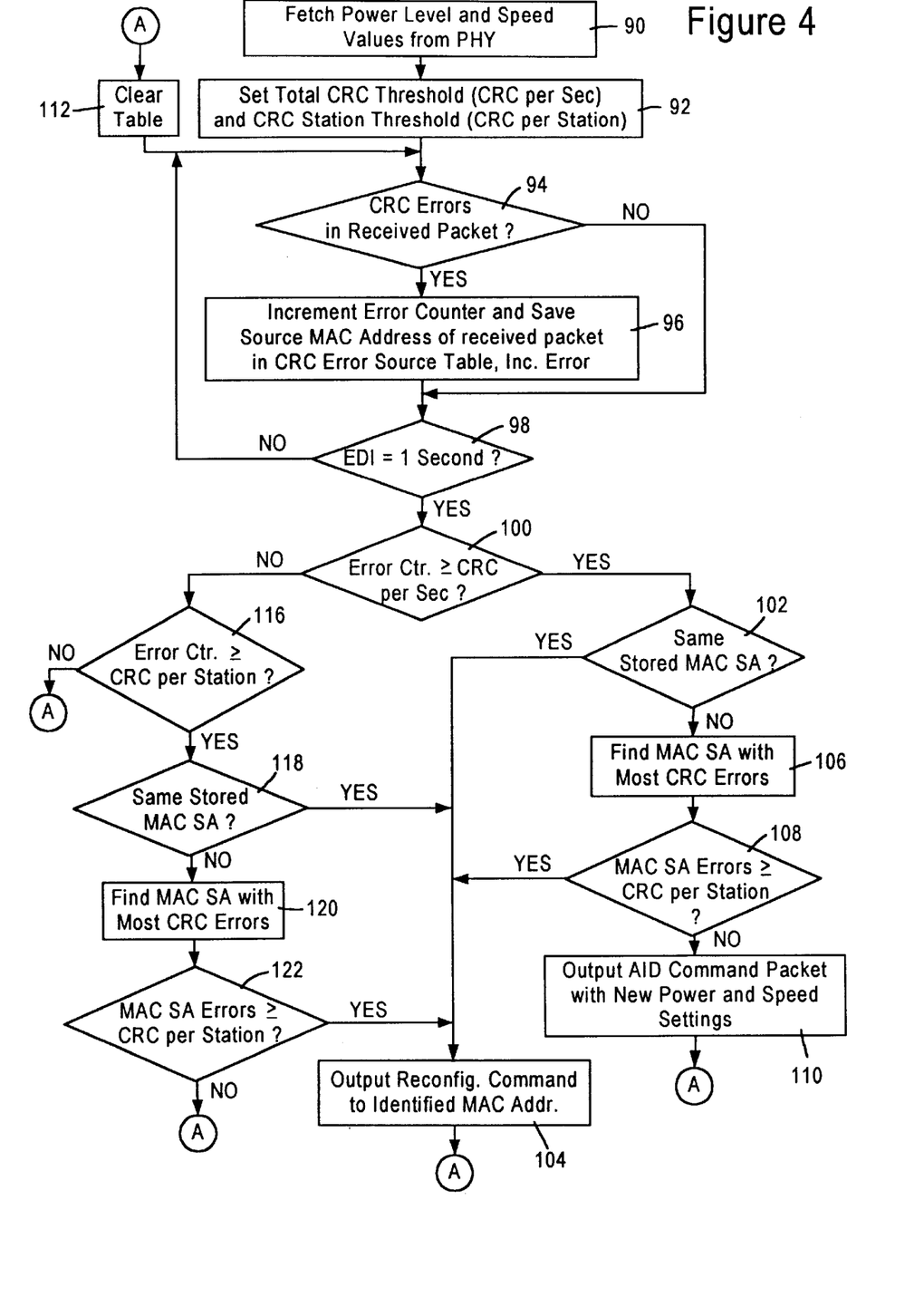
FIG. 4 is a flow diagram illustrating the method of requesting controlling transmission parameters according to an embodiment of the present invention.

FIG. 4 is a diagram illustrating the method by the link controller 80 of controlling the transmission parameters of selected network stations according the an embodiment of the present invention. The link controller 80 first fetches the transmit power level (TxGain) and the transmit data rate from the memories 60 and 62 in the PHY 20, and stores the transmit power level and transmit data rate in memories 84a and 84b, respectively (step 90). The link controller 80 then sets the total CRC threshold (CRCperSec) and the CRC station threshold (CRCperStation) in memories 84c and 84d, respectively (step 92). The CRC per second threshold had a default value of 10, and represents the threshold causing the link controller 80 to output an AID command packet to all network stations if the CRC counter 86 exceeds this threshold. The CRC per station threshold, having default value of 5, represents the threshold value at which the link controller 80 outputs a reconfigure command packet to a specific station if the number of CRC errors generated by the specific station exceeds the threshold value.

Following step 92, the link controller 80 enters a run time state, where the media access transceiver 23 (composed of the PHY 20 and the MAC 22) receives data packets from transmitting network stations. In particular, the PHY 20 recovers the data stream, and the MAC 22 detects whether there is a CRC error present in any of the received data packets.

The link controller 80 determines whether there are any CRC errors in a received packet in step 94 during transfer of the received data packet from the MAC 22 to the system memory by the OS 24. If the link controller 80 detects a CRC error, the link controller 80 increments the error counter 86, saves the source address of the received packet in the table 88, (e.g., SA 1), and increments the MAC SA Errors column of table 88 in step 96. Hence, the link controller 80 uses table 88 to keep track of the CRC errors on a per-node basis. The link controller 80 keeps track of the error detection interval (EDI) using timer 82, and checks in step 98 if the error detection interval has expired. If the error detection interval has not expired, the link controller 80 continues to monitor for detected errors for the corresponding transmitting network nodes.

If in step 98 the error detection interval has expired, the link controller 80 checks in step 100 whether the error counter 86 exceeds the overall CRC per second threshold stored in memory 94c. If the CRC error counter value 86 exceeds the threshold value stored in memory 84c, the link controller 80 checks in step 102 if all the CRC errors are caused by the same source address. If all CRC errors are caused by the same source address (i.e., the same transmitting network station), the link controller 80 causes the MAC 22 to output a reconfigure command to the network station having the identified source address in step 104. In particular, the link controller forwards the identified source address (MAC SA) to the MAC 22, which generates the reconfigure command by placing the supplied source address (e.g., SA 1) as the destination address for the reconfigure command packet. The destination network node, upon receiving the reconfigure command data packet, recognizes itself as the destination for the reconfigure command packet by correlating the destination address, and reconfigures the transmission parameters by increasing the output power and/or reducing the output data rate to 700 kb/s. After reconfiguring itself, the destination node ignores any subsequent reconfiguration command packet for an arbitrary time period (e.g., 10 seconds).

Assuming in step 102 that all the errors counted by counter 86 were not from the same source address, the link controller 80 checks in step 106 to determine which MAC source address had the highest number of CRC errors. The link controller 80 then checks in step 108 whether the identified MAC source address having the greatest number of errors exceeds the CRC per station threshold stored in memory 84d. If the identified network station exceeds the CRC per station threshold, the link controller 80 causes the MAC 22 to output the reconfigure command packet the identified MAC address in step 104. However, if in step 108 the MAC address having the highest number of CRC errors does not exceed the CRC per station threshold, the link controller 80 causes the MAC 22 to output an AID command packet that specifies new output power and new transmit speed settings for all the network stations in step 110. Hence, the AID command is used in step 110 to improve transmission performance for all network stations generally, whereas the link controller 80 uses step 104 to improve the transmission performance of a selected network station.

Following the output of the reconfigure command in step 104 or the AID command in step 110, the link controller 80 resets the error counter 86 and clears the table 88 in step 112 to begin monitoring for a new error detection interval.

Assuming in step 100 that the CRC error counter 86 does not exceed the CRC per second threshold stored in memory 84c, the link controller 80 then checks in step 116 if the error counter 86 exceeds the CRC per station threshold stored in memory 84d. If the error counter 86 does not equal or exceed the minimum threshold CRC per station stored in memory 84d, then performance by the transmitting stations is deemed acceptable, the counter 86 and table 88 are cleared in step 112, and monitoring resumes in step 94. However, if in step 116 the error counter 86 exceeds the minimum threshold of the CRC per station, the link controller 86 checks in step 118 if all the errors are caused by the same MAC source address. If all the errors are from the same MAC source address in step 118, the link controller 80 causes the reconfigure command to be output to the identified transmitting network station in step 104. However, if all the errors were not caused by the same MAC source address in step 118, the link controller 80 identifies the MAC source address having the most CRC errors in step 120. If the identified MAC address has a corresponding number of errors greater than the lower threshold of the CRC per station in step 122, the link controller 80 causes the reconfigure command to be output to the identified MAC source address in step 104. Otherwise, the error counter 86 and the table 88 are cleared in step 112, and monitoring continues.

According to the disclosed embodiment, CRC errors from received data packets are monitoring on a per station basis.

Hence, a receiving network station can identify those network stations encountering severe distortion caused by telephone wiring topology relative to other network stations, and send a data packet to the identified network station to improve transmission parameters. Hence, transmitting stations encountering severe degradation can improve their transmission performance, without causing other transmitting stations encountering minimal distortion to unnecessarily increase the output power. Moreover, the disclosed arrangement can be used to enable each of the transmitting network stations to intelligently track which station require extra transmission performance due to telephone networking topology. For example, a transmitting network station may track a number of reconfiguration packets received from different network stations, and selectively change its transmission performance depending on the destination of a transmitted packet.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. A network station configured for sending and receiving network signals between other network stations on a telephone line medium, the network station including a media access transceiver comprising:

a physical layer transceiver configured for receiving first data packets from the telephone line medium and transmitting second data packets onto the telephone line medium at a selected output gain and transmission speed;

a media access controller layer; and an operating system layer connected according to Open Systems Interconnection (OSI), the media access controller configured for receiving digital signals transferred from the physical layer transceiver and for detecting a presence of an error in the first data packets, and the operating system layer including a link controller configured for causing the physical layer transceiver to output onto the telephone line medium a configuration data packet, having a selected destination address corresponding to a selected one of the other network stations, based on the detected errors in the first data packets from the selected one network station reaching a first prescribed threshold, the configuration data packet causing the selected one network station to adjust at least one transmission parameter for reduction of the errors in received data packets.

2. The network station of claim 1, wherein the link controller comprises an error counter for counting a total number of the detected errors for the other network stations within a prescribed time interval, the link controller causing the physical layer transceiver to output a control data packet to the other network stations in response to the error counter reaching a second prescribed threshold greater than the first prescribed threshold.

3. The network station of claim 2, wherein the link controller further comprises a table for storing source addresses of the first data packets having the detected errors and a count of the detected errors from the corresponding network station, the link controller configured for outputting the configuration data packet to the selected one network station in response to the corresponding count reaching the first prescribed threshold.

4. The network station of claim 1, wherein the physical layer transceiver has first and second registers for storing a link speed and the selected output gain used for transmission of the second data packets, respectively, and the media access controller layer hs an error detection circuit configured for detecting said error in the first data packets.

5. The network station of claim 1, wherein the link controller includes a table for storing source addresses of the first data packets having the detected errors and a count of the detected errors from the corresponding network station, the link controller configured for outputting the configuration data packet to the selected one network station in response to the corresponding count reaching the first prescribed threshold.

6. The network station of claim 5, wherein the physical layer transceiver outputs a control data packet as an access identifier (AID) control packet to the other network stations in response to a total number of the detected errors for the other network stations reaching a second prescribed threshold greater than the first prescribed threshold.

* * * * *